United States Patent Office 2,847,413
Patented Aug. 12, 1958

2,847,413

5'-DESOXYRIBOFLAVIN AND PROCESSES FOR PREPARING THE SAME

Karl A. Folkers, Plainfield, and Clifford H. Shunk, Scotch Plains, N. J., assignors to Merck & Co., Inc., Rahway, N. J., a corporation of New Jersey No Drawing. Application November 23, 1953
Serial No. 393,944

4 Claims. (Cl. 260—251.5)

This invention relates to new organic compounds and their preparation, and particularly to 5'-desoxyriboflavin, to processes for preparing this compound and to the intermediate compounds obtained by these processes.

The development and use of animal and microbial vitamin assays require that the diet or culture medium must be made deficient in the vitamin factor being tested and the animals or microorganisms employed must be depleted of reserve stores of the aforesaid factor. These requirements present investigators with many problems and difficulties among which are poor assay reproducibilities and extended time for assays.

These obstacles, which are inherent in most vitamin assays, have been overcome in certain instances by the use of antimetabolites. Antimetabolites are substances that will block the utilization of the dietary vitamin supply and thereby cause an artificial deficiency which is more pronounced than that usually attained by dietary control. Their use saves the investigator the painstaking task of creating a true dietary deficiency by depriving the test organism of any source of the vitamin, and results in better reproducibility and shorter assay time requirements.

In accordance with this invention a new compound is produced which has been found to be a very effective antimetabolite for riboflavin (vitamin $B_2$). This new compound is 5'-desoxyriboflavin and may be chemically represented as follows:

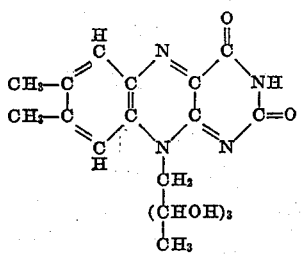

In accordance with the invention, this compound can be prepared as follows: The compound 2,3-isopropylidene-5-iodo-methyl-D-ribofuranoside (compound I) is converted by catalytic hydrogenation to 2,3-isopropylidene-5-desoxymethyl-D-ribofuranoside (compound II); the 2,3-isopropylidene group is removed from this compound by mild acid hydrolysis in alcohol thereby producing 5-desoxymethyl-D-ribofuranoside (compound III); the latter compound is subjected to strong acid hydrolysis to form 5-desoxy-D-ribose (compound IV) which is reacted with 3,4-dimethylaniline thereby producing N-(5'-desoxy-D-ribosyl)-4,5-dimethylaniline (compound V); the resulting compound is then converted by catalytic hydrogenation to N-(5'-desoxy-D-ribityl)-4,5-dimethylaniline (compound VI) which, when reacted with diazotized aniline, forms N-(5'-desoxy-D-ribityl)-2-phenylazo-4,5-dimethylaniline (compound VII). This may be reacted with a cyclic ureide, such as barbituric acid or alloxan, to form the desired product 5'-desoxyriboflavin (compound VIII).

The reactions indicated hereinabove may be chemically represented as follows:

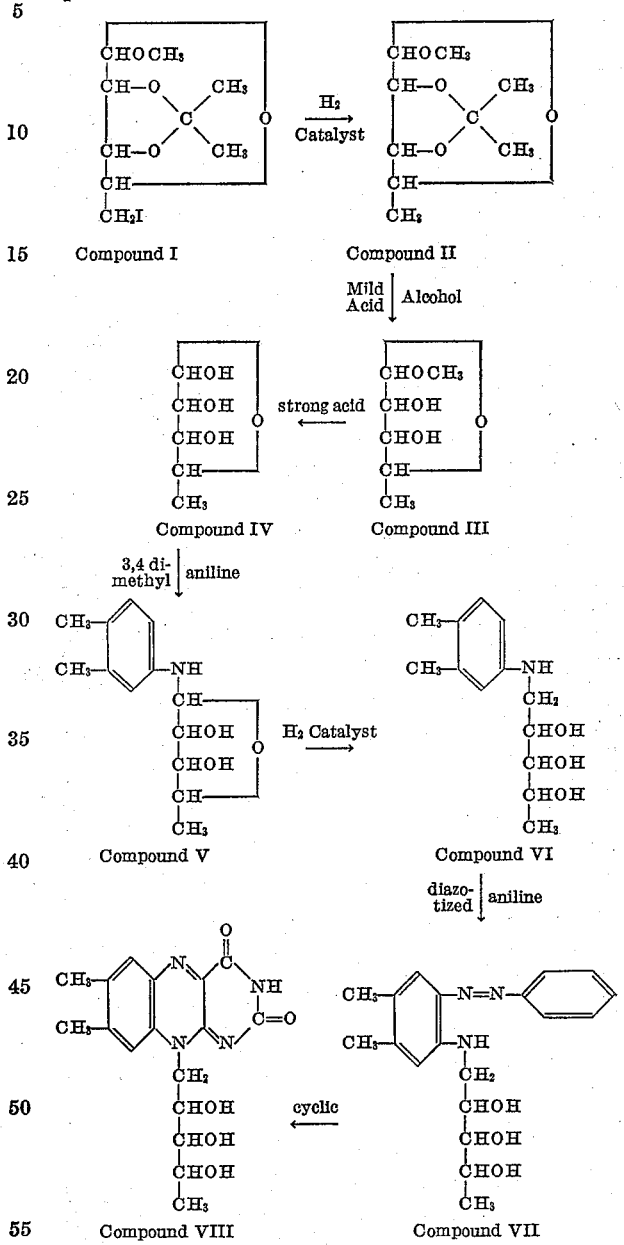

The compound 2,3-isopropylidene-5-iodo-methyl-D-ribofuranoside (compound I) may also be converted directly to 5-desoxy-D-ribose (compound IV) by catalytic hydrogenation followed by direct treatment with hot aqueous mineral acid without isolation of the intermediate compouds. The direct procedure has the advantage of reducing the number of steps necessary to produce the final product.

The 2,3-isopropylidene-5-iodo-methyl-D-ribofuranoside is converted to 2,3-isopropylidene-5-desoxy-methyl-D-ribofuranoside by catalytic hydrogenation in a solvent solution. The presence of a slight excess over one equivalent of sodium hydroxide in the hydrogenation solution has been found desirable in that it neutralizes the hydriodic acid formed during the reduction. The hydrogenation is preferably carried out at atmospheric pressure at a temperature from 25 to 50° C. until absorption of hydrogen ceases. Higher pressure and temperatures may be used but careful control is necessary to avoid hydrogenolysis. Following the hydrogenations the catalyst is removed by filtration and any excess alkalinity is neutralized. The filtrate may then be concentrated in vacuo until an appropriate volume is reached. The concentrated solution may then be extracted with chloroform and the solvent evaporated to give the 2,3-isopropylidene-5-desoxy-methyl-D-ribofuranoside. This material may be used directly without further purification.

The 2,3-isopropylidene group may be removed from 2,3-isopropylidene-5-desoxy-methyl-D-ribofuranoside by heating at reflux temperature in alcoholic solution containing a dilute mineral acid. The reflux temperature should not appreciably be above 65° C. The preferred mineral acid is sulfuric acid, and the reaction is usually complete in about three hours. The reaction product is treated with barium carbonate or the like to remove the mineral acid. The solution is then filtered and evaporated to yield 5-desoxy-methyl-D-ribofuranoside.

The hydrolysis of 5-desoxy-methyl-D-ribofuranoside to 5-desoxy-D-ribose may be carried out by heating a solution of 5-desoxy-methyl-D-ribofuranoside in an aqueous non-oxidizing mineral acid. If the temperature is maintained at 65° to 100° C. about one and a half hours it is sufficient to effect this direct conversion. The mineral acid is then removed and the filtrate evaporated to dryness to give a crude product. Extraction of this crude material with alcohol followed by evaporation of the extract gives an oily product which is substantially pure 5-desoxy-D-ribose.

The reaction of 5-desoxy-D-ribose with 3,4-dimethylaniline may be carried out in a solvent by heating at from 20 to 50° C. and will require up to four hours for completion. The temperature used is inversely proportional to the time required for the reaction. The N-(5'-desoxy-D-ribosyl)-4,5-dimethylaniline crystallizes from the reaction mixture upon cooling.

The catalytic hydrogenation of N-(5'-desoxy-D-ribosyl)-4,5-dimethylaniline in an organic solvent yields N-(5'-desoxy-D-ribityl)-3,4-dimethylaniline. This hydrogenation requires about fifteen hours for completion at 25° C. under atmospheric pressure. Higher temperature and pressure will shorten the reaction time but careful control must be maintained to prevent hydrogenolysis. The catalyst is removed by filtration and the filtrated solution is evaporated to yield a crystalline N-(5'-desoxy-D-ribityl)-3,4-dimethylaniline.

The N-(5'-desoxy-D-ribityl)-3,4-dimethylaniline is reacted with diazotized aniline or a derivative thereof at about −5° C. to 5° C. The mixture is preferably buffered to maintain a pH of about 3 to 3.5 during the reaction. The reaction mixture is agitated at −5° to 5° C. for about three hours and then the temperature is permitted to rise to about 20° C. to cause completion of the reaction. The product formed, N-(5'-desoxy-D-ribityl)-2-phenylazo-4,5-dimethylaniline, may be crystallized from aqueous alcohol.

The N-(5'-desoxy-D-ribityl)-2-phenylazo-4,5-dimethylaniline is condensed with barbituric acid or alloxan to produce the final product 5'-desoxyriboflavin. The condensation proceeds most readily in an unreactive organic acid or a mixture of an unreactive organic acid with an additional organic solvent for the reactants, boiling above about 70° C., such as ethanol, propanol, butanol and dioxane. The preferred solvent mixture is n-butanol with acetic acid. The solution is refluxed for several hours then chilled to below 25° C. to precipitate the crude product from the reaction mixture. The crude material may be readily recrystallized from hot aqueous mineral acid to obtain substantially pure 5'-desoxyriboflavin.

The following examples are given for purpose of illustration.

EXAMPLE 1

*2,3-isopropylidene-5-iodo-methyl-D-ribofuranoside*

2,3 - isopropylidene-5-p-toluenesulfonyl-methyl-D-ribofuranoside is converted to the 5-iodo compound by heating in acetone with sodium iodide in a sealed tube at 100° C. for two hours. The solution was diluted with water and extracted with chloroform. The chloroform extract was washed free of iodine with sodium thiosulfate solution. The solvent was evaporated and the pale yellow syrupy product recovered.

EXAMPLE 2

*2,3-isopropylidene-5-desoxy-methyl-D-ribofuranoside*

A solution of 10.0 g. (0.032 mole) of 2,3-isopropylidene-5-iodo-methyl-D-ribofuranoside in 100 ml. of methanol and 14.4 ml. (0.036 mole) of 2.5 N sodium hydroxide was hydrogenated at room temperature and atmospheric pressure using 0.10 g. of Adams' platinum oxide catalyst. When the absorption of hydrogen had ceased, the solution was neutralized with carbon dioxide and filtered. The methanol was removed from the filtrate by distillation and the remaining solution extracted with four portions of chloroform. The extracts were combined and concentrated under reduced pressure with a bath temperature below 50° C. to yield 2,3-isopropylidene-5-desoxy-methyl-D-ribofuranoside. A portion of the oily product was distilled for analysis, B. P. 66° C. (9 mm.), $[\alpha]_D 23°$ −109° (c, 2 absolute ethanol).

*Analysis.*—Calcd. for $C_9H_{16}O_4$: C, 57.43; H, 8.57. Found: C, 57.58; H, 8.95.

EXAMPLE 3

*5-desoxy-methyl-D-ribofuranoside*

A solution of 15.9 g. (0.085 mole) of 2,3-isopropylidene-5-desoxy-methyl-D-ribofuranoside in 90 ml. of methanol and 40 ml. of 0.4 N sulfuric acid was refluxed for three hours. Further heating did not change the rotation of the solution. The solution was neutralized with barium carbonate, filtered and concentrated under reduced pressure with the bath temperature being kept below 50° C. The residual oil was dried in vacuo over phosphorous pentoxide. A portion of the yellow oil was distilled at 83–88° C. (0.3 mm.) yielding substantially pure 5-desoxy-methyl-D-ribofuranoside, $[\alpha]_D 23°$ −76.5° (c, 2 absolute ethanol). The compound was crystalline but low melting and very hygroscopic.

*Analysis.*—Calcd. for $C_6H_{12}O_4$: C, 48.64; H, 8.17. Found: C, 48.66; H, 8.14.

EXAMPLE 4

*5-desoxy-D-ribose*

A solution of 5.5 g. (0.037 mole) of 5-desoxy-methyl-D-ribofuranoside in 50 ml. of 0.4 N sulfuric acid was heated at 90° C. for one and one-half hours. Longer heating did not change the rotation of the solution. The cooled solution was neutralized with barium carbonate, treated with decolorizing charcoal and filtered. The filtrate was evaporated to an oil in vacuo at 50° C. and the residue extracted with methanol. The extract was filtered and concentrated as before. The resulting oil was dried over phosphorous pentoxide giving substantially pure 5-desoxy-D-ribose, $[\alpha]_D 23°$ +11.2° (c, 4 water).

*Analysis.*—Calcd. for $C_5H_{10}O_4$: C, 44.77; H, 7.52. Found: C, 44.62; H, 7.34.

EXAMPLE 5

*Direct conversion of 2,3-isopropylident-5-iodomethyl-D-ribofuranoside to 5'-desoxy-D-ribose*

2,3 - isopropylidene - 5 - iodo-methyl-D-ribofuranoside (7.44 g., 0.024 mole) was reduced in 100 ml. of methanol containing 9.5 ml. of 2.5 N sodium hydroxide as previously described. After neutralization with carbon dioxide, the catalyst was removed by filtration. The filtrate was added to 500 ml. of water and the solution was distilled until 400 ml. of distillate had been collected. Ten milliliters of 2 N sulfuric acid were added to the distillate and the solution was refluxed for one and one-half hours and then distilled to a volume of 50 ml. The cooled residue was neutralized with barium carbonate and worked up as in Example 4 to yield 5'-desoxy-D-ribose, $[\alpha]_D 23° +12.0$ (c, 3 water).

EXAMPLE 6

N-(5'-desoxy-D-ribosyl)-4,5-dimethylaniline

A solution of 2.80 g. (0.023 mole) of 3,4-dimethylaniline in 10 ml. of ethanol was added to a solution of 2.48 g. (0.0185 mole) of 5-desoxy-D-ribose in 15 ml. of ethanol. On standing at room temperature (25° C.) for three hours a crystalline precipitate separated. After cooling at 5° C. overnight, the crystals were collected and washed with cold ethanol and with ether giving substantially pure N-(5'-desoxy-D-ribosyl)-4,5-dimethylaniline, M. P. 135–136°, $[\alpha]_D 23° +95°$ (c, 2 pyridine).

*Analysis.*—Calcd. for $C_{13}H_{19}NO_3$: C, 65.80; H, 8.07; N, 5.90. Found: C, 66.10; H, 8.14; N, 5.84.

EXAMPLE 7

N-(5'-desoxy-D-ribityl)-3,4-dimethylaniline

A suspension of 7.98 g. of N-(5'-desoxy-D-ribosyl)-3,4-dimethylaniline in 500 ml. of methanol was hydrogenated with 0.25 g. of Adams' platinum oxide catalyst at about 25° C. and atmospheric pressure. The absorption of hydrogen ceased after about fifteen hours. The catalyst was removed by filtration and the filtrate concentrated in vacuo with the temperature being kept below 50° C. The residual semi-crystalline mixture was triturated with acetone and the resulting crystals recovered. The crude N - (5' - desoxy - D - ribityl)-3,4-dimethylaniline (M. P. 139–143° C.) was used directly in the next step. A sample for analysis was prepared by recrystallization from isopropyl alcohol, M. P. 146–148°, $[\alpha]_D 23° -37°$ (c, 0.4 pyridine).

*Analysis.*—Calcd. for $C_{13}H_{21}NO_3$: C, 65.24; H, 8.85; N, 5.85. Found: C, 64.80; H, 8.71; N, 6.04.

EXAMPLE 8

N-(5'-desoxy-D-ribityl)-2-phenylazo-4,5-dimethylaniline

A solution of 2.13 g. (0.023 mole) of aniline in 6.25 ml. of 12 N hydrochloric acid and 15 ml. of water was cooled to 0° C. A total of 1.60 g. of solid sodium nitrite was added at such a rate that the temperature of the solution did not exceed 30° C. After the sodium nitrite had been added, the solution was kept at 0° C. for one-half hour.

To a suspension of 4.30 g. (0.018 mole) of N-(5'-desoxy-D-ribityl)-4,5-dimethylaniline in 40 ml. of water was added 6.1 ml. of 12 N hydrochloric acid and 6.06 g. of sodium acetate. The mixture was cooled to −5° C. and the solution of diazotized aniline prepared above was added. The resulting solution was stirred at −5° C. for one and one-half hours and then at 0 to 5° C. for one and one-half hours. After warming to 20° C., a solution of 5.72 g. of sodium acetate in 50 ml. of water was added at such a rate that the pH remained at 3 to 3.5 and the temperature at 17 to 20° C. After stirring the resulting mixture for about fourteen hours, the insoluble product was collected and washed with water. The product was recrystallized from 200 ml. of 60% ethanol and dried over phosphorous pentoxide giving substantially pure N - (5' - desoxy-D-ribityl)-2-phenylazo-4,5-dimethylaniline melting at 174–176°.

*Analysis.*—Calcd. for $C_{19}H_{25}N_3O_3$: C, 66.45; H, 7.34; N, 12.24. Found: C, 66.32; H, 7.26; N, 11.71.

EXAMPLE 9

5'-desoxyriboflavin

N - (5' - desoxy - D - ribityl) - 2 - phenylazo - 4,5 - dimethylaniline (4.98 g., 0.015 mole) and barbituric acid (3.05 g., 0.024 mole) were added to 43 ml. of n-butanol and 8 ml. of glacial acetic acid. The resulting mixture was refluxed with stirring for two and one-quarter hours. After cooling in ice for one hour, the insoluble material was collected and washed with n-butanol. The solid was then triturated with water at 80° C. for one-half hour, filtered and washed with methanol. The product was purified by dissolving it in 25 ml. of hot 6 N hydrochloric acid, treating with decolorizing charcoal, filtering and diluting the filtrate with 50 ml. of hot water. On cooling 5'-desoxyriboflavin crysallized. The product melted with decomposition at 282–283°. A second recrystallization from hydrochloric acid as described above afforded substantially pure 5' - desoxyriboflavin, M. P. 283–285° (dec.); $[\alpha]_D 23° +60°$ (c, 1, 6 N hydrochloric acid). The compound had absorption maxima at 2230 mu ($E=33,400$), 2670 mu ($E=33,800$) and 3710 mu ($E=10,600$).

*Analysis.*—Calcd. for $C_{17}H_{20}N_4O_5$: C, 56.66; H, 5.60; N, 15.56. Found: C, 56.83; H, 5.62; N, 15.27.

The 5'-desoxy riboflavin is not limited to applications such as biological assays but may also extend to animal and human nutrition.

Any departure from the above description which conforms to the present invention is intended to be included within the scope of the claims.

What is claimed is:

1. 5'-desoxyriboflavin.

2. The process which comprises reacting N-(5'-desoxy-D - ribityl) - 2 - phenylazo - 4,5 - dimethylaniline with a cyclic ureide selected from the group consisting of barbituric acid and alloxan to produce 5'-desoxyriboflavin.

3. The process which comprises reacting N-(5'-desoxy-D - ribityl) - 2 - phenylazo - 4,5 - dimethylaniline with barbituric acid to produce 5' - desoxyriboflavin.

4. The process which comprises treating 2,3-isopropylidene - 5 - iodo - methyl - D - ribofuranoside with hydrogen in the presence of a hydrogenation catalyst and treating the reaction mixture with a mineral acid to produce 5 - desoxy - D - ribose, this latter compound is reacted with 3,4 - dimethylaniline to produce N-(5'-desoxy - D - ribosyl) - 4,5 - dimethylaniline which is treated with hydrogen in the presence of a hydrogenation catalyst to produce N - (5' - desoxy - D - ribityl)-3,4-dimethylaniline, this compound is treated with diazotized aniline to produce N - (5' - desoxy - D - ribityl)-2 - phenylazo - 4,5 - dimethylaniline which is reacted with a cyclic ureide selected from the group consisting of barbituric acid and alloxan to produce 5' - desoxy-riboflavin.

References Cited in the file of this patent

UNITED STATES PATENTS

| Number | Name | Date |
| --- | --- | --- |
| 2,032,263 | Daughenbaugh | Feb. 25, 1926 |
| 2,261,608 | Tishler et al. | Nov. 4, 1941 |
| 2,311,033 | Dickey et al. | Feb. 16, 1943 |
| 2,359,305 | Dickey et al. | Oct. 3, 1944 |
| 2,365,777 | Raymond | Dec. 26, 1944 |
| 2,417,143 | Tishler et al. | Mar. 11, 1947 |
| 2,422,997 | Wuest | June 24, 1947 |
| 2,472,007 | Farkas et al. | May 31, 1949 |
| 2,477,560 | Flexer et al. | Aug. 2, 1949 |